United States Patent
Patberg

(10) Patent No.: US 7,052,072 B2
(45) Date of Patent: May 30, 2006

(54) SEALING FOR AN OPENING CLOSURE ON A CAR BODY, ESPECIALLY IN SPACE-FRAME DESIGN

(75) Inventor: Lothar Patberg, Aachen (DE)

(73) Assignee: ThyssenKrupp Stahl AG, Aachen (DE)

( * ) Notice: Subject to any disclaimer, the term of this patent is extended or adjusted under 35 U.S.C. 154(b) by 8 days.

(21) Appl. No.: 10/483,109

(22) PCT Filed: Jul. 31, 2002

(86) PCT No.: PCT/EP02/08512

§ 371 (c)(1),
(2), (4) Date: Jun. 24, 2004

(87) PCT Pub. No.: WO03/011624

PCT Pub. Date: Feb. 13, 2003

(65) Prior Publication Data

US 2004/0232724 A1 Nov. 25, 2004

(30) Foreign Application Priority Data

Aug. 1, 2001 (DE) .............................. 101 37 699

(51) Int. Cl.
*B60J 10/08* (2006.01)
*B62D 25/04* (2006.01)

(52) U.S. Cl. .............................. 296/146.9; 296/193.06; 296/1.08; 49/498.1; 49/490.1; 277/921

(58) Field of Classification Search ............. 296/146.9, 296/193.06, 203.03, 1.08; 49/475.1, 498.1, 49/490.1; 277/641, 642, 644, 645, 921
See application file for complete search history.

(56) References Cited

U.S. PATENT DOCUMENTS

| 5,356,194 | A | | 10/1994 | Takeuchi |
| 5,820,198 | A | | 10/1998 | Nozaki |
| 5,964,496 | A | * | 10/1999 | Nozaki et al. ........... 296/146.9 |
| 6,854,786 | B1 | * | 2/2005 | Berglund et al. ........ 296/146.9 |
| 2003/0122400 | A1 | * | 7/2003 | Berglund et al. ........ 296/146.9 |
| 2004/0189044 | A1 | * | 9/2004 | Nagata .................... 296/146.9 |

FOREIGN PATENT DOCUMENTS

DE    43 14 123    11/1994

* cited by examiner

*Primary Examiner*—Patricia L. Engle
(74) *Attorney, Agent, or Firm*—Proskauer Rose LLP

(57) ABSTRACT

In order to attach a seal on an aperture rim of a motor vehicle body in the space-frame design, wherein said aperture rim is edged by a profile frame and is closable by means of a door or flap, for the purpose of minimising the installation effort as well as the weight, the invention provides for a profile seal (13a, 14a) comprising a lip (13a, 14a) to be jammed between the profile frame (1) and a cover panel (11) which edges the outside of the profile frame (1) and is attached to said profile frame (1), wherein said seal is supported at the rear by the profile frame (1), which is profiled accordingly, so that the closing force which is exerted on said profile seal (13, 14) by the door ($T_1$, $T_2$) or flap can be absorbed.

3 Claims, 2 Drawing Sheets

SEALING FOR AN OPENING CLOSURE ON A CAR BODY, ESPECIALLY IN SPACE-FRAME DESIGN

BACKGROUND OF THE INVENTION

The invention relates to a seal on an aperture rim of a motor vehicle body, with said aperture rim being edged by a profile frame and being closable by means of a door or flap.

In the case of a motor vehicle body comprising a stressed-skin construction, the seal is clipped onto the connecting flanges of the shells which constitute the profile frame. The flanges are connected to the profile frame with adequate stiffness to be able to absorb the forces which are exerted, by the closed door or flap, by way of the seal.

If instead of shells welded-together, extruded hollow sections are used for the profile frames, then the flanges of these profiles comprise corresponding webs which provide adequate stiffness to be able to absorb the forces acting on them by the closed door by way of the seal which has been clipped into place.

In the case of the space-frame design, in which hollow sections which have been longitudinally seam welded and which are made from sheet metal plates are used as a profile frame, there are no such flanges or webs for the attachment of seals.

SUMMARY OF THE INVENTION

It is thus the object of the invention to create a seal which is suitable for the aperture rim of doors or flaps on the profile frame which edges the aperture rim, particularly for motor vehicle bodies produced in the space-frame design.

According to the invention this object is met by a seal of the type mentioned in the introduction in that a lip of the seal is jammed between the profile frame, which does not have flanges or webs, and a cover panel which covers the outside of the profile frame and is attached to said profile frame, with said seal being supported at the rear by the profile frame for absorption of the closing force which is exerted at the front on said seal by the closed door or flap.

The invention does not require any weight-increasing components for the purpose of attachment of the seal and for the purpose of support. As a rule, a cover panel for the profile frame is provided anyway. Since said cover panel only has a holding function but not a support function, for this holding function it does not have to be designed to be stronger than for the cover function. The profile frame can absorb the forces which the door/flap exerts on it without any problems because it usually forms part of the load-bearing structure of the body and is thus already designed to withstand considerably larger forces.

To provide good support to the seal, the profile frame can be profiled accordingly, in particular it can comprise a trough.

The principle according to the invention, for supporting and holding the seal, provides no problems in the regions where the profile frame is straight or curved. Even in the problem zones where the profile frame, which has been joined from hollow sections, forms sharp corners, the seal can be held by clamping and can be supported. To this effect, one embodiment of the invention provides for cover panels to be attached in the case of profile frames made from hollow sections joined to form sharp corners, wherein said cover panels, which correspond to the profile of the profile frame, round off the corners. In addition to their function as holders for the seal, these cover panels can also serve as reinforcers or strengtheners at the corners of the joined hollow profiles.

Connection of the cover panels for holding the seal and/or of the cover panels on the corners, can take place with normal connection techniques, such as cementing/bonding, welding etc.

BRIEF DESCRIPTION OF THE DRAWINGS

Below, the invention is shown by means of a drawing which shows just one embodiment. The following are shown in detail.

DETAILED DESCRIPTION OF THE INVENTION

Figure 1:
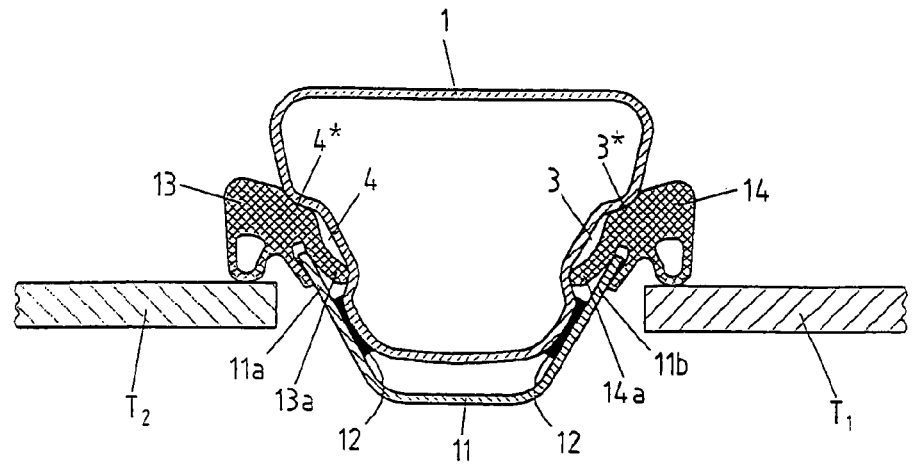
FIG. 1 a cross-section of two seals on a profile frame of two aperture rims for two doors.
Figure 2:
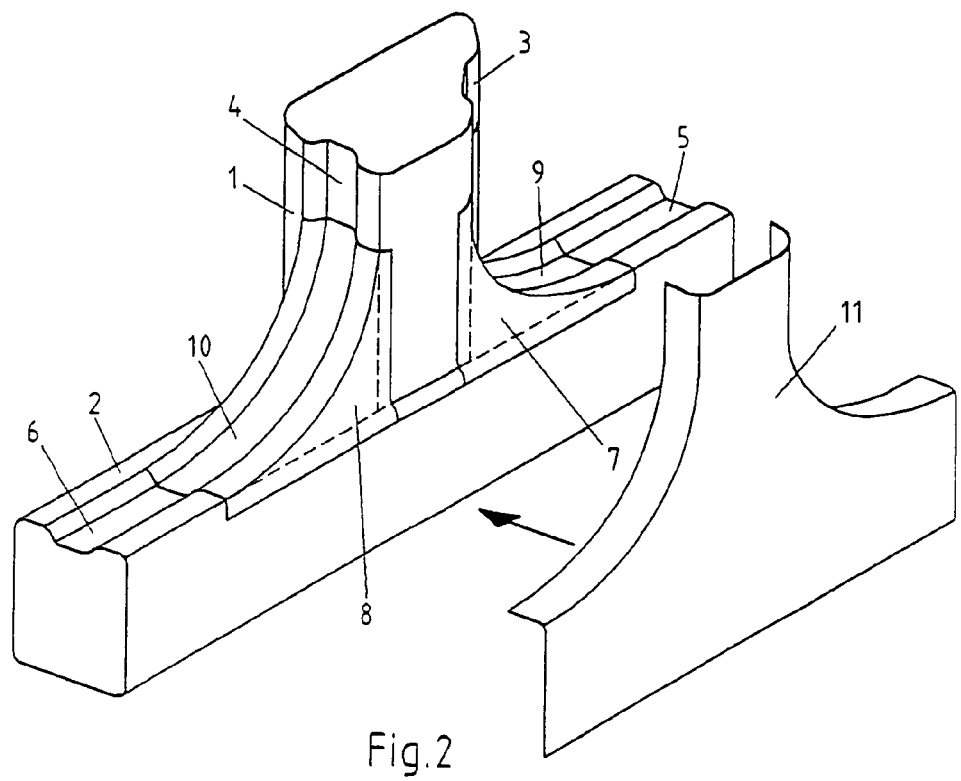
FIG. 2 a perspective section view of two profile frames made from two hollow profiles joined by forming sharp corners.
Figure 3:
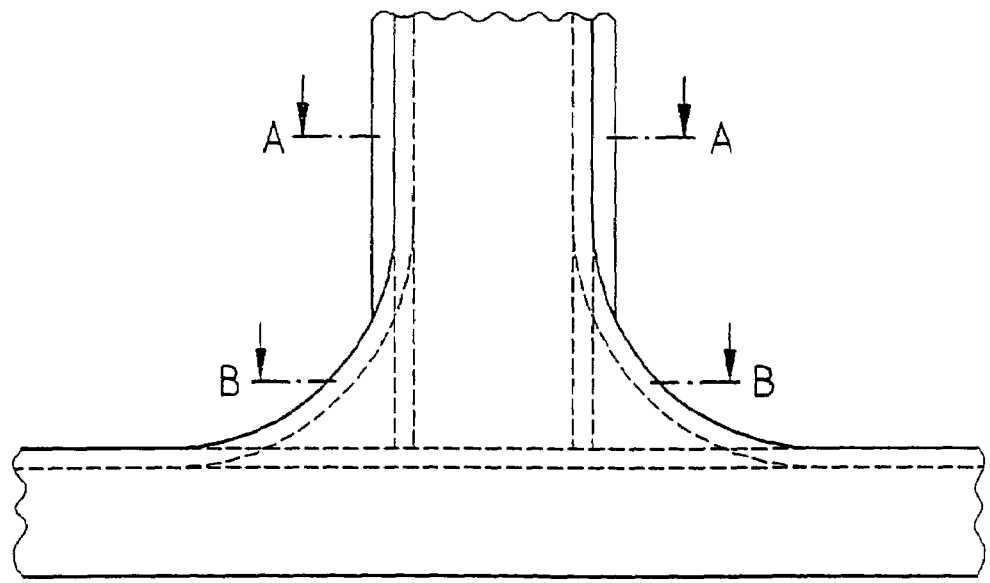
FIG. 3 a view of the profile frames according to FIG. 2.
Figure 4:
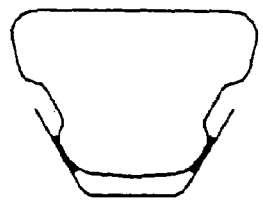
FIG. 4 a cross-section of the profile frames according to FIG. 3 along line A—A in FIG. 3.
Figure 5:
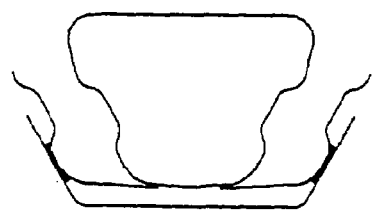
FIG. 5 a section view of the profile frames according to FIG. 3 along line B—B in FIG. 3.

The figures show a section view of a B-pillar 1 and a door sill 2 as components of the load-bearing structure of a motor-vehicle body shell in the space-frame design.

The B-pillar 1 and the door sill 2 form components of two profile frames for aperture rims of doors $T_1$, $T_2$. Each comprises hollow sections which have been formed from sheet metal plates and are longitudinally seam welded and have obtained the desired profile by way of interior high-pressure metal-forming. This profile is characterised in that it comprises trough-shaped profiles 3, 4, 5, 6 which extend longitudinally.

The B-pillar 1 and the door sill 2 have been joined, i.e. welded together, in a way which creates sharp corners. In the sharp corners, there is a cover panel 7, 8 which rounds the corners, with the profile of said cover panels 7, 8 matching the profile of the B-pillar 1 and the door sill 2 so that the trough-shaped profiles 3, 4, 5, 6 continue by way of corresponding profiles 9, 10 in the cover panels 7, 8.

These cover panels 7, 8 can be joined by bonding or by spot welding.

On the outside, the profile frame 1, 2 comprises a cover panel 11, also referred to as cladding, with said cover panel 11 being essentially a U-shaped profile. This cover panel 11, too, is attached to the profile frame 1, 2 with the usual joining techniques, in particular an adhesive connection 12 obtained by cementing or bonding. As is shown particularly clearly in FIG. 1, the limbs 11*a*, 11*b* of the U-shaped cover panel 11 extend to the area of the trough-shaped profiles 3, 4. A profiled seal 13, 14, which has been made more rigid by a steel insert, has been clipped onto these free limbs 11*a*, 11*b*, wherein one lip 13*a*, 14*a* of the seal 13, 14 is jammed between the free limb 11*a*, 11*b* and the trough-shaped profile 3, 4. The profile of the seal 13, 14 and the profile of the trough-shaped profile 3, 4 are matched such that the seal 13, 14 is supported at the rear by the flank 3*\, 4*\ of the trough-shaped profile 3, 4. Thus, if the door $T_1$, $T_2$ is closed, and the closing force of the door $T_1$, $T_2$ acts on the seal 13, 14, said seal 13, 14 rests against the rigid B-pillar 1 of the profile frame.

The invention thus uses already existing components, namely the cover panel 11 (planking), which has been provided for covering the profile frame, and the stiff profile frame 1, 2, for attachment and support of the seal 13, 14 at the aperture rims for the doors $T_1$, $T_2$. This means that no special profiles are required for the space-frame design and therefore no additional weight arises. Installation is extremely easy as the profiled seals merely need to be clipped into place. They can be held in the manner of a snap connection.

The invention claimed is:

1. A seal on an aperture rim of a motor vehicle body, with said aperture rim being edged by a profile frame and being closable by means of a door or flap, wherein a lip of the seal is jammed between the profile frame which does not have a flange or web, and a cover panel which covers the outside of the profile frame and is attached to said profile frame, with said seal being supported at the rear by the profile frame for absorption of the closing force which is exerted at the front on said seal by the closed door or flap.

2. The seal according to claim 1, wherein in the region where the seal is supported the profile frame comprises trough-shaped profiles.

3. The seal according the claim 1, wherein cover panels are attached in the case of profile frames made from hollow sections joined to form sharp corners, wherein said cover panels which correspond to the profile of the profile frame round off the corners.

* * * * *